Patented Nov. 24, 1925.

1,563,204

UNITED STATES PATENT OFFICE.

LEON LILIENFELD, OF VIENNA, AUSTRIA.

PLASTIC MASS AND PROCESS OF MAKING SAME.

No Drawing. Application filed January 11, 1921. Serial No. 436,605.

(GRANTED UNDER THE PROVISIONS OF THE ACT OF MARCH 3, 1921, 41 STAT. L., 1313.)

*To all whom it may concern:*

Be it known that I, LEON LILIENFELD, of Podhajce, Poland, a citizen of Poland, residing at 1 Zeltgasse, Vienna VIII, Austria, have invented certain new and useful Improvements in Plastic Masses and Processes of Making Same (for which I have filed applications for foreign patents as follows: Austria, filed August 1, 1919 (now Patent 90,010); Germany, filed July 19, 1920 (now Patent 357,707); Great Britain, filed May 14, 1920 (now Patent 149,319); France, filed July 23, 1920 (now Patent 521,000); Italy, filed July 31, 1920 (now Patent 210/536); Sweden, filed July 30, 1920 (now Patent 54,449); Norway, filed July 23, 1920 (now Patent 37,755); Denmark, filed August 19, 1920 (now Patent 29,621), of which the following is a specification.

The present invention is based on the observation that the alkyl, or the aralkyl-derivatives of carbohydrates having the empirical formula $n(C_6H_{10}O_5)$ such as cellulose, starch, dextrin, etc. (hereinafter called ethers of polysaccharides) or their conversion products or derivatives when mixed with certain oily liquids give products which can be used for many technical purposes. The oils in question can be conveniently made by treating high-boiling coal tar oils, i. e., any coal tar hydrocarbons having boiling points above 140° C., and especially those boiling between 140 and 220° C., with acetylene in the presence of aluminum chlorid (0.5 to 10% of the latter, based on the amount of the tar oil being treated, being a suitable proportion to employ) and distilling the reaction mixture (optionally after a previous removal or decomposition of the aluminum chloride compound). The oil has a blue fluorescence, and the fractions boiling in vacuo (for example at a pressure of 20 millimetres) between about 85° C. and about 260° C. are especially suitable for the purpose.

The fractions of tar boiling above 140° C., which have been found particularly advantageous are the higher boiling fractions of solvent naphtha, or hydrocarbons which can be isolated therefrom. The treatment with acetylene and aluminum chlorid, and the product of such treatment, are not claimed herein, but in my co-pending application Serial No. 436,382, filed January 10, 1921. According to the relative proportions of the constituents (carbohydrate ether and the specified oil) in the mixture, masses are obtained which are either so soft and resilient that they can be used as a substitute for rubber, gutta-percha, balata, glycerine-glue and the like, or plastic masses which are of the nature of celluloid or horn.

Mixtures of alkyl or aralkyl derivatives of carbohydrates having the empirical formula $n(C_6H_{10}O_5)$ such as cellulose, starch, dextrin and the like (i. e. ethers of the polysaccharids), with the aforesaid oils are adapted for use in the production of the following technical products:—artificial leather, films, photographic articles or coating of any kind, lacquers, varnishes, paints, electrical insulating material, dressings for fabrics, leather, paper and the like, sizing materials for textile materials, coating materials of any kind, printing materials or thickening for fixing means (vehicles) for pigments, artificial threads and textile fibres, artificial hair, adhesives, cements, sizes for paper-sizing, etc.

For carrying the process into effect, alkyl, or aralkylethers of the cellulose, starch and the like (for instance ethylether of the cellulose or benzylether of cellulose including those of higher stages of alkylation) which are insoluble in water but soluble in organic solvents, are dissolved in a volatile solvent (such as benzene, a mixture of benzene and alcohol, carbon tetrachloride, chloroform, a mixture of chloroform and alcohol, acetone, a mixture of acetone and alcohol and the like), mixed with the aforesaid oils, and worked up in known manner so as to make one of the above mentioned products. Since the said oils have a high dissolving power for alkyl-derivatives and aralkyl-derivatives of cellulose, starch, dextrin and the like, it is possible, when an effective stirring machine or mill is used, to obtain a series of technical products without using any ancillary solvents or by using very small quantities of such solvents. "Other plastic substances" or agglutinants such as nitrate of cellulose, acetate of cellulose or other cellulose esters and the like or other colloiding agents or softening agents such as camphor, phosphoric esters of phenols, animal and vegetable oils and the like can be added to or incorporated with the mixtures of the alkyl-, aryl- and aralkyl-derivatives of the carbohydrates having the empirical formula $n(C_6H_{10}O_5)$, their derivatives or conversion products (ethers of the polysaccharids) and the aforementioned oils.

EXAMPLES.

1. Celluloid-like masses.

25 to 50 kilogrammes of one of the aforesaid oils (e. g. that produced by reacting on the higher boiling portions of solvent naphtha with acetylene in the presence of aluminum chlorid) are mixed with 75 to 120 kilogrammes of a water insoluble ethyl-cellulose or benzyl-cellulose or ethylstarch or benzylstarch, optionally together with a solvent for the ether and then treated in the usual manner for the manufacture of celluloid-like masses.

2. Artificial leather.

In a mixture of 60 parts by weight of benzene and 30 parts by weight of alcohol or in 90 parts by weight of benzene alone, 10 to 15 parts by weight of an ethyl-cellulose easily soluble in the said solvents, is dissolved, and this solution is mixed with 7½ to 15 parts of one of the aforesaid oils described in the specification of Letters Patent No. 436,382. Then a pigment (such as lampblack or a lake or the like) is added to the solution and the latter is spread in one or several layers on a suitable textile fabric or on paper. If several layers are used, it is possible to calender or press the various layers. It is also possible to mix first the pigment with one of the aforesaid oils described above and to add the resultant mixture to the solution of cellulose-derivatives.

The artificial leather can be provided with any grain or pattern by pressing or embossing.

3. Artificial leather.

30 parts by weight of an ethyl-cellulose or benzyl-cellulose or ethylstarch or benzylstarch soluble in one of the aforesaid oils are mixed with 20 to 35 parts by weight of one of such oils, preferably while warm, until a uniform paste or solution is obtained. With this solution, a pigment such as lampblack or the like or a lake is mixed, after which the paste is calendered on a suitable surface such as fabric, paper or the like in one or several layers.

It is also possible to mix together the cellulose-ether or starch-ether with the oil in the presence of a very small quantity of a suitable solvent such as benzene or a mixture of benzene and alcohol.

4. Insulating material for cables and the like.

The substance described in Example 3, is used for covering wires or cables in the usual manner.

The use of the described mixtures or plastic substances according to the above described process for the other purposes mentioned hereinbefore is obvious.

The expression "articles useful in the technics of cellulose derivatives" as used herein, and in the following claims, means; plastic and elastic masses, artificial filaments and threads, artificial hair, films, coatings of all kind, lacquers, varnishes, paints, insulating materials, dressing and sizing materials, printing materials, cements, glues, sizes and the like.

What I claim as my invention and desire to secure by Letters Patent is:—

1. Process of converting ethers of polysaccharides into articles useful in the technics of cellulose derivatives, which process comprises using, as basic materials, mixtures of ethers of polysaccharides with oily bodies which are formed when acetylene is caused to act upon the higher boiling portions of coal tar oil, in the presence of aluminium chloride.

2. Process of converting ethers of polysaccharides into articles useful in the technics of cellulose derivatives, which process comprises using, as basic materials, mixtures of ethers of polysaccharides with oily bodies which are formed when acetylene is caused to act upon the fractions of coal tar oil which boil at above 140° C., in the presence of aluminium chloride.

3. Process of converting ethers of polysaccharides into articles useful in the technics of cellulose derivatives, which process comprises using, as basic materials, mixtures of ethers of polysaccharides with oily bodies which are formed when acetylene is caused to act upon the fractions of coal tar oil which boil between 140 and 220° C., in the presence of aluminium chloride.

4. Process of converting ethers of polysaccharides into articles useful in the technics of cellulose derivatives, which process comprises using, as basic materials, mixtures of ethers of polysaccharides with oily bodies which are formed when acetylene is caused to act upon the higher boiling fractions of solvent naphtha, in the presence of aluminium chloride.

5. Process of converting ethers of polysaccharides into articles useful in the technics of cellulose derivatives, which process comprises using, as basic materials, mixtures of ethers of polysaccharides in admixture with other plastic substances, with oily bodies which are formed when acetylene is caused to act upon the higher boiling portions of coal tar oil, in the presence of aluminum chlorid.

6. Process of converting ethers of polysaccharides into articles useful in the technics of cellulose derivatives, which process comprises using as basic materials, mixtures of ethers of polysaccharides in admixture with colloiding agents and with oily bodies which are formed when acetylene is caused to act upon the higher boiling portions of coal tar oil, in the presence of aluminium chlorid.

7. Process of converting ethers of polysaccharides into articles useful in the technics of cellulose derivatives, which process comprises using as basic materials, mixtures of ethers of polysaccharides in admixture with filling materials, and with oily bodies which are formed when acetylene is caused to act in the presence of aluminium chloride, upon the higher boiling portions of coal tar oil.

8. Process of converting ethers of polysaccharides into articles useful in the technics of cellulose derivatives, which process comprises incorporating ethers of polysaccharides, with oily bodies which are formed when acetylene is caused to act upon the higher boiling portions of coal tar oil, in the presence of aluminum chlorid.

9. Process of converting ethers of polysaccharides into articles useful in the technics of cellulose derivatives, which process comprises mixing ethers of polysaccharides with oily bodies which are formed when acetylene is caused to act upon the portions of coal tar oil, boiling above 140° C., in the presence of aluminum chloride.

10. A composition of matter which comprises an ether of a polysaccharide and an oily body formed by the action of acetylene upon the higher boiling portions of coal tar oil in the presence of aluminium chlorid.

11. A composition of matter which comprises an ether of a polysaccharide and an oily body formed by the action of acetylene on the fractions of coal tar oil having boiling points above 140° C. in the presence of aluminium chlorid.

12. A composition of matter which comprises an ether of a polysaccharide and an oily body formed by the action of acetylene on the higher boiling constitutents of solvent naphtha in the presence of aluminum chlorid.

13. Articles useful in the technics of cellulose derivatives which articles contain ethers of polysaccharides in admixture with such oily bodies as are formed when acetylene is caused to act upon the higher boiling portions of coal tar oil in the presence of aluminium chloride and other plastic substances.

14. Articles useful in the technics of cellulose derivatives which articles contain ethers of polysaccharides in admixture with colloiding agents, and such oily bodies as are formed when acetylene in the presence of aluminium chloride is caused to act upon the higher boiling portions of coal tar oil.

15. Articles useful in the technics of cellulose derivatives which articles contain ethers of polysaccharides in admixture with such oily bodies as are formed when acetylene is caused to act upon the fractions of coal tar oil boiling above 140° C., in the presence of aluminium chlorid.

16. A plastic composition comprising an ether of a polysaccharid and an oily body, which latter exists in the free state as a fluorescent oil boiling in vacuo between 85 and 260° C., and which can be produced by the action of acetylene on aromatic hydrocarbons boiling at above 140° C., such oil being resistant to water.

17. A plastic composition comprising an ether of cellulose and an oily body, which later exists in the free state as a fluorescent oil boiling in vacuo between 85 and 260° C., and which can be produced by the action of acetylene on aromatic hydrocarbons boiling at above 140° C., such oil being resistant to water.

18. Articles useful in the technics of cellulose derivatives which articles contain ethers of polysaccharides in admixture with such oily bodies as are formed when acetylene is caused to act upon the higher boiling portions of coal tar oil, in the presence of aluminum chloride.

19. The process of plasticizing ethers of polysaccharides which comprises the addition thereto of oils as herein described, the same being formed by the action of acetylene on the constituents of tar oil boiling above 140° C., in the presence of a halogen compound of aluminum.

20. A new composition capable of being molded and set comprising an aralkyl ether of cellulose.

21. A new plastic composition capable of being molded and set comprising an aralkyl ether of a polysaccharide, together with a plasticizing agent therefor.

In testimony whereof I have signed my name to this specification.

Dr. LEON LILIENFELD.